Sept. 21, 1971        H. FLEISSNER           3,606,774
APPARATUS FOR THE CONTINUOUS WET-TREATMENT OF MATERIAL
        LENGTHS AND SLIVER-TYPE MATERIALS
              Filed Nov. 29, 1968
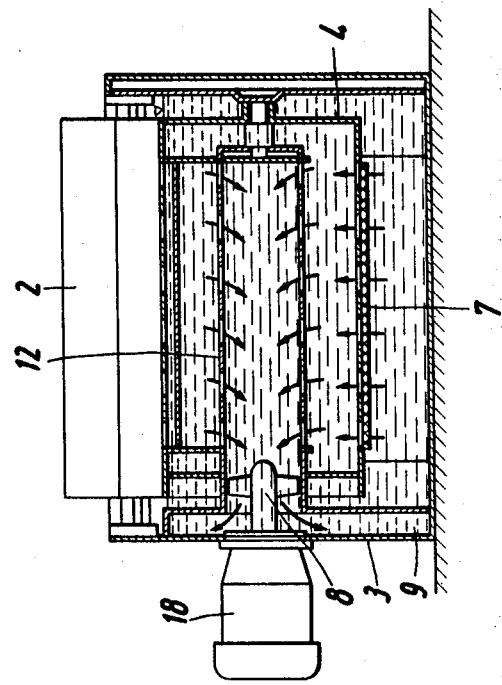
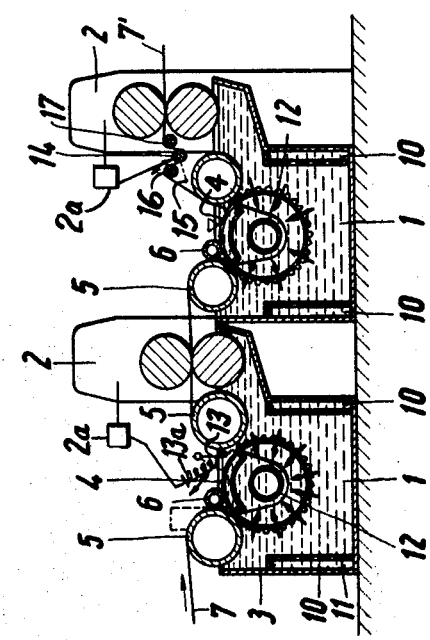
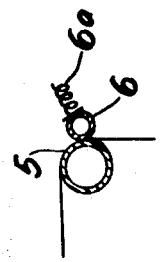
Inventor:
HEINZ FLEISSNER
By: Craig & Antonelli
ATTORNEYS United States Patent Office 3,606,774
Patented Sept. 21, 1971

3,606,774
APPARATUS FOR THE CONTINUOUS WET-TREATMENT OF MATERIAL LENGTHS AND SLIVER-TYPE MATERIALS
Heinz Fleissner, Egelsbach, near Frankfurt am Main, Germany, assignor to Fleissner GmbH
Filed Nov. 29, 1968, Ser. No. 785,006
Claims priority, application Germany, Nov. 29, 1967, P 16 35 111.4
Int. Cl. B05c 3/134, 3/136, 3/138
U.S. Cl. 68—22                                18 Claims

ABSTRACT OF THE DISCLOSURE

The present disclosure is directed to a process and apparatus for the continuous wet-treatment of textile materials which comprises introducing the material to be treated in radial loops onto the surface of a perforated conveying element, said conveying element being submerged in a treatment liquid, conveying the material being treated through the treatment liquid on the surface of said conveying element while simultaneously drawing the treatment liquid through the material from the outside of the conveying element to the inside thereof so that the material is penetrated by said treatment liquid and held to the conveying element, squeezing the material removed from the conveying element and controlling the speed of the conveying element and the speed of the squeezer. The speed of the conveying element and the squeezer is controlled by a measuring unit disposed between the conveying element and the squeezer, said measuring unit acting upon a regulating element.

BACKGROUND OF THE INVENTION

The present invention relates to a process and apparatus for the continuous wet-treatment of material lengths and sliver-type materials which are passed in a container over at least one conveying means, for example a perforated roller, immersed in a treatment liquid. The material being treated is penetrated by the liquid which flows through the perforated roller from the outside to the inside thereof, so that said material is held to the roller surface. Guide rollers are also correlated to the perforated roller.

Apparatus for the wet-treatment, especially for washing textile materials, are well known, particularly wherein loose fibrous material is passed over a conveyor belt to a perforated roller. The perforated roller is subjected to a suction draft so that the material is intensively penetrated by the liquid while being transported on the roller. After having passed the roller, the material is again passed onto a conveyor belt and transported to a squeezer. The portion of the perforated roller which is not covered with the material being treated is provided with a baffle which interrupts the suction draft at this portion of said roller. In this manner, an easy detachment of the material at the discharge side of the roller is ensured.

Furthermore, apparatus with a perforated roller subjected to a suction draft are well known, said perforated rollers being used in the treatment of material lengths. In these devices, guide rollers are used instead of conveyor belts.

In the well known suction roller devices the textile lengths are passed straight over the perforated roller. However, since many textile materials tend to shrink during the wet-treatment, tensions result which effect a pronounced width shrinkage of the material length, especially if knit goods are involved.

SUMMARY OF THE INVENTION

An object of the present invention is to avoid the prior art disadvantages in the continuous wet-treatment of material lengths and sliver-type materials.

Another object of the present invention is to provide an improved process and apparatus for the wet-treatment of textile materials, wherein a tensionless material guidance is achieved during the treatment process.

A further object of the present invention is to provide an improved process and apparatus for the wet-treatment of textile materials wherein materials which may tend to shrink during the treatment process are not subjected to any tension during said process.

A still further object of the present invention is to provide an improved method and apparatus for the wet-treatment of textile materials wherein means are provided for regulating the speed of the conveying element and/or the squeezer means disposed therebehind.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the continuous wet-treatment of textile materials may be obtained by correlating to a guide roller provided at the material feeding side of the apparatus a roller of smaller diameter and by equipping at least one of these rollers with a drive so that its speed is infinitely variable with respect to the speed of the conveying element, for example a perforated roller. This arrangement renders it possible to feed the material being treated to the perforated roller in radial loops. In this way, the material may not only shrink during the treatment without being subjected to any tension, but by feeding a substantially larger material quantity, for example about five to ten times the material quantity, an essentially longer and thus more intense treatment at the same material feeding and discharge speeds can be obtained.

It has been found that if the material is fed in loops to a conveying element, for example a perforated roller, through which the treatment medium flows from the outside to the inside, the draw-off speed of the subsequent squeezer must be set very accurately, especially if the material shrinks. In order to avoid time-consuming and difficult speed adjustments by hand, it is suggested, according to the present invention, to arrange a measuring unit between the perforated roller and the squeezer which acts upon a regulating element, by means of which the speed of the perforated roller or of the squeezer can be controlled. An effective design results if the measuring unit consists of a compensating roller which is arranged between the guide roller at the material discharge side of the perforated roller, and the squeezer. Furthermore, it is expedient if an expander roller is correlated to the squeezer in order to remove lengthwise creases from the material before it is supplied to the squeezer. In this case, it is also possible to design the compensating roller as an expander roller. If a compensating roller is utilized, the material can also be handled in straight-through passage, that is without feeding it in loops.

However, generally a large degree of overfeeding, that is of loop formation, is desirable because the reaction times can be increased accordingly. In devices in which the material is always fed in loops onto the perforated roller, the measuring unit may consist of a swiveling mounted bar which is arranged at the material discharge side of the perforated roller and which is preferably forced against the guide roller by means of spring tension. As a result of the loops in the material length, the bar is, more or less, swivelled away from the guide roller. This swiveling motion can be used for adjusting the drive of the subsequent squeezer. The drive can be controlled mechanically, for example via a variable gear, or electrically, for example via a commutator motor, or pneumatically. The pneumatic control offers the advantage that the deflection of the measuring unit may be extremely small, so that the measuring accuracy is correspondingly high.

BRIEF DESCRIPTION OF THE DRAWINGS

The present invention will become more fully understod from the detailed description given hereinbelow and the accompanying drawings which are given by way of illustration only and thus are not limitative of the present invention and wherein, FIG. 1 is a longitudinal section of the apparatus of the present invention, FIG. 1a shows the relationship between rollers 5 and 6 in FIG. 1, and FIG. 2 is a cross section of the apparatus of the present invention according to FIG. 1.

DESCRIPTION OF THE PREFERRED EMBODIMENTS

Referring now to the drawing, wherein like reference numerals are used throughout the various views to designate like parts, the apparatus of the present comprises two treatment bowls 1 behind each of which a squeezer 2 is installed. The bowls 1 comprise a container 3 filled with liquid in which a perforated roller 4 as well as two guide rollers 5 are disposed. A small roller 6 is correlated to the guide roller 5 at the material inlet side of the apparatus. The roller 6 is forced against the roller 5 by springs 6a. The roller 6 should have a very small diameter in order to provide the nip between the rollers 5 and 6 is near as possible to the perforated roller 4. For a good and uniform loop formation, it is advantageous if the nip is arranged at the liquid level or beneath the liquid level. In this embodiment of the present invention, the roller 5 is driven. It is possible, for example by means of an intermediate gear, to infinitely vary the conveying speed of the roller 5 as against the conveying speed of the perforated roller 4 so that material lengths of sliver-type materials 7 can be fed in radial loops to the perforated roller 4. The liquid is drawn out of the perforated roller 4 by means of a pump 8 which is disposed at one face of the perforated roller and is pumped back into the treatment bowl equally distributed over the entire working width through a lateral duct 9 and distribution spaces 10. As shown, a drive 18 for the pump 8 may be mounted at the outside of the container 3 and may be connected directly with the pump. For this purpose, the distribution spaces 10 have perforated inside walls 11.

If large working widths are involved, a stationary sieve member 12 is coaxially disposed with respect to the perforated roller for equalizing the suction draft. In the first bowl seen in the direction of material passage, a swivel mounted bar 13 is provided for controlling the speed of the subsequent squeezer 2, said bar being forced against the roller 5 and/or against the material 7 between the bar 13 and the roller 5 by spring tensions means 13a. If the material is limply suspended between discharge roll 5 and the sieve drum, the bar 13 pivots more strongly in the direction toward the pair of pressure rolls 2. An electric element 2a affects the control of the velocity of the pair of pressure rolls 2. On the other hand, if the material is retained by the sieve drum at the piont of detachment, that is, if the material is under tension between the sieve drum and the subsequent roll 5, the bar 13 pivots in the direction toward the line shown as a dotted line. Thereupon, the electric element will rotate the pair of pressure rolls at the appropriate speed.

A similar regulation is conducted by the idler roll 14. If the tension on the material is minor, the roll drops downward due to its own weight, which has the effect that the motor of the subsequent pair of pressure rolls 2, runs faster, due to pivoting about the axle 15. In a similar manner, when the material is under stronger tension, the pair of pressure rolls will rotate more slowly.

In the second bowl which in the figure is of slightly different design, a compensating roller 14 which is swivel mounted around a fixed point 15 is provided as a control unit. The roller 14 does not rest with its whole weight on the material length 7 but is weight-released by means of counterweights, springs or by means of similar elements. Rollers 16 and 17 are correlated to the compensating roller 14. It is of advantage to design the rollers 16 and 17 or at least the roller 17 as an expander roller. An expander roller consists either of a convex-curved roll or of a roll, the outer surface of which is provided, starting at the center, with a counter thread. By this surface configuration, the web of material is automatically stretched and expanded from the center toward both sides. As shown by the dashed line, the material can, with this arrangement, be passed from the compensating roller 14 directly to the squeezer 2 without passing the expander roller 17. However, it is also possible to provide, instead of a suction roller, a perforated roller through which the liquid flows from the outside to the inside of the apparatus due to a differential liquid level. With such a roller the water flows out of one or both faces of the roller into lateral collecting containers from which it is pumped back into the bowl.

The invention being thus described, it will be obvious that the same may be varied in many ways. Such variations are not to be regarded as a departure from the spirit and scope of the invention, and all such modifications as would be apparent to one skilled in the art are intended to be included within the scope of the following claims.

It is claimed:

1. An apparatus for the continuous wet-treatment of textile materials which comprises at least one treatment bowl containing a treatment liquid, at least one perforated roller means rotatably disposed in the treatment bowl and immersed in the treatment liquid, first inlet guide roller means correlated to the perforated roller means and second roller means of smaller diameter than said first guide roller means and correlated thereto at the inlet, at least one of said roller means being provided with a drive means so that its speed is infinitely variable with respect to the speed of the perforated roller means, pump means disposed at one face of the perforated roller for drawing the treatment liquid through the roller from the outside to the inside thereof so that the material being treated is held to the perforated roller surface, and squeeze means disposed behind the perforated roller means.

2. The apparatus of claim 1, wherein the second roller means is forced against the first roller means by a spring means.

3. The apparatus of claim 2, wherein the nip of the first and second roller means are as near as possible to the perforated roller means to effect a uniform radial loop formation in the material being introduced to said performated roller means.

4. The apparatus of claim 3, wherein the nip of the first and second roller means are disposed at the liquid level or below the liquid level.

5. The apparatus of claim 1, wherein lateral duct means are disposed on the pump side of the treatment bowl, said lateral duct means communicating with said pump means and with distribution channels provided with perforated inside walls for pumping the treatment liquid back to the treatment bowl equally distributed over the entire working width.

6. The apparatus of claim 1, wherein a stationary sieve member is coaxially disposed in the perforated roller for equalizing the suction draft.

7. The apparatus of claim 1, wherein a third guide roller means is disposed in the treatment liquid between the perforated roller means and the squeezer means at the material discharge side of said perforated roller means, said third guide roller means being associated with a swivel mounted bar for controlling the speed of the squeezer means, said bar being forced against the material being conveyed on the third guide roller means by spring tension means.

8. The apparatus of claim 1, wherein a third guide roller means is disposed in the treatment liquid between the perforated roller means and the squeezer means at the material discharge side of said perforated roller means, and compensating roller means disposed between the perforated roller means and the squeezer means, said compensating roller means being swivel-mounted around a fixed point.

9. The apparatus of claim 8, wherein additional roller means are provided on both sides of the compensating roller means.

10. The apparatus of claim 9, wherein at least one of said additional roller means is an expander roller means.

11. The apparatus of claim 1, wherein the squeezer means comprise two roller means which are so disposed as to sqeeze the material between their peripheral surfaces.

12. An apparatus for the continuous wet-treatment of textile materials which comprises a first treatment bowl containing a treatment liquid, at least one perforated roller means rotatably disposed in the first treatment bowl and immersed in the treatment liquid, first inlet guide roller means correlated to the perforated roller means and second roller means of smaller diameter than said first guide roller means and correlated thereto at the inlet, at least one of said roller means being provided with a drive means so that its speed is infinitey variable with respect to the speed of the perforated roller means, pump means disposed at one face of the perforated roller means for drawing the treatment liquid through the roller from the outside to the inside thereof so that the material being treated is held to the perforated roller surface, squeezer means disposed behind the perforated roller means, third guide roller means disposed in the treatment liquid between the perforated roller means and the sqeezer means at the material discharge side of said perforated roller means, said third guide roller means being associated with a swivel mounted bar for controlling the speed of the squeezer means, said bar being forced against the material being conveyed on the third guide roller means by spring tension and a second treatment bowl containing a treatment liquid and following the first treatment bowl, at least one perforated roller means rotatably disposed in the second treatment bowl and immersed in the treatment liquid, first inlet guide roller means correlated to the perforated roller means and second roller means of smaller diameter than said first guide roller means and correlated thereto at the inlet, at least one of said roller means being provided with a drive so that its speed is infinitely variable with respect to the speed of the perforated roller means, pump means disposed at one face of the perforated roller means for drawing the treatment liquid through the roller from the outside to the inside thereof so that the material being treated is held to the perforated roller surface, squeezer means disposed behind the perforated roller means, third guide roller means disposed in the treatment liquid between the perforated roller means and the squeezer means at the material discharge side of said perforated roller means, and compensating roller means disposed between the perforated roller means and the squeezer means, said compensating roller means being swivel-mounted around a fixed point.

13. The apparatus of claim 12, wherein additional roller means are provided on both sides of the compensating roller means.

14. The apparatus of claim 12, wherein at least one of said additional roller means is an expander roller means.

15. The apparatus of claim 12, wherein the compensating roller means is an expander roller.

16. An apparatus for the continuous wet-treatment of textile materials which comprises at least one treatment bowl containing a treatment medium at least one conveying means subjected to a suction draft rotatably disposed in the treatment bowl and immersed in the treatment liquid, means for introducing the material to be treated to the surface of the conveying means in radial loops, squeezer means for removing the material from the conveying means, and a measuring unit means disposed between the conveying means and the squeezer means, said measuring unit acting upon a regulating element by means of which the speed of the conveying means and of the squeezer is controlled.

17. The apparatus of claim 16, wherein the measuring unit comprises a compensating roller which is arranged between a guide roller at the material discharge side of the conveying means and the squeezer means.

18. The apparatus of claim 16, wherein the measuring unit comprises a swivel mounted bar which is arranged at the material discharge side of the conveying means between a guide roller and the squeezer means, said bar controlling the speed of the squeezer means.

References Cited

UNITED STATES PATENTS

| | | | |
|---|---|---|---|
| 2,239,636 | 4/1941 | Weiss | 68—22X |
| 2,276,605 | 3/1942 | Andrews | 68—22 |
| 3,126,556 | 3/1964 | Fleissner | 68—22X |
| 3,235,932 | 2/1966 | Jones | 68—22X |
| 3,460,898 | 8/1969 | Fleissner | 68—22X |

WILLIAM I. PRICE, Primary Examiner

U.S. Cl. X.R.

68—177, 184